C. JÖRGENSEN AND G. A. DUNMORE.
RESILIENT TIRE.
APPLICATION FILED APR. 22, 1918.

1,403,085.

Patented Jan. 10, 1922.
2 SHEETS—SHEET 1.

Inventor
Charles Jörgensen
and George A. Dunmore
By Joshua R H Potts
Attorney

C. JÖRGENSEN AND G. A. DUNMORE.
RESILIENT TIRE.
APPLICATION FILED APR. 22, 1918.

1,403,085.

Patented Jan. 10, 1922.
2 SHEETS—SHEET 2.

Inventor
Charles Jörgensen
and
George A. Dunmore
By
Attorney

UNITED STATES PATENT OFFICE.

CHARLES JÓRGENSEN AND GEORGE A. DUNMORE, OF MONTREAL, QUEBEC, CANADA.

RESILIENT TIRE.

1,403,085.　　　　　　　　Specification of Letters Patent.　　Patented Jan. 10, 1922.

Application filed April 22, 1918. Serial No. 230,176.

*To all whom it may concern:*

Be it known that we, CHARLES JÓRGENSEN, a citizen of the United States, residing at Montreal West, Quebec, Canada, and GEORGE A. DUNMORE, a citizen of the United States, residing at Montreal, Quebec, Canada, have invented certain new and useful Improvements in Resilient Tires, of which the following is a specification.
Our invention relates to resilient tires, and the object of our invention is to provide a tire which shall possess as much resiliency as the ordinary pneumatic tire and not be a subject to their disadvantages such as punctures, blow-outs, etc. A further object of the invention is to provide a tire, as mentioned including an outer tube or shoe, which shall, if desired, be of the usual form, and which may be readily attached to and detached from any wheel constructed for use with demountable rims. Other objects will appear hereinafter.

Figure 1:
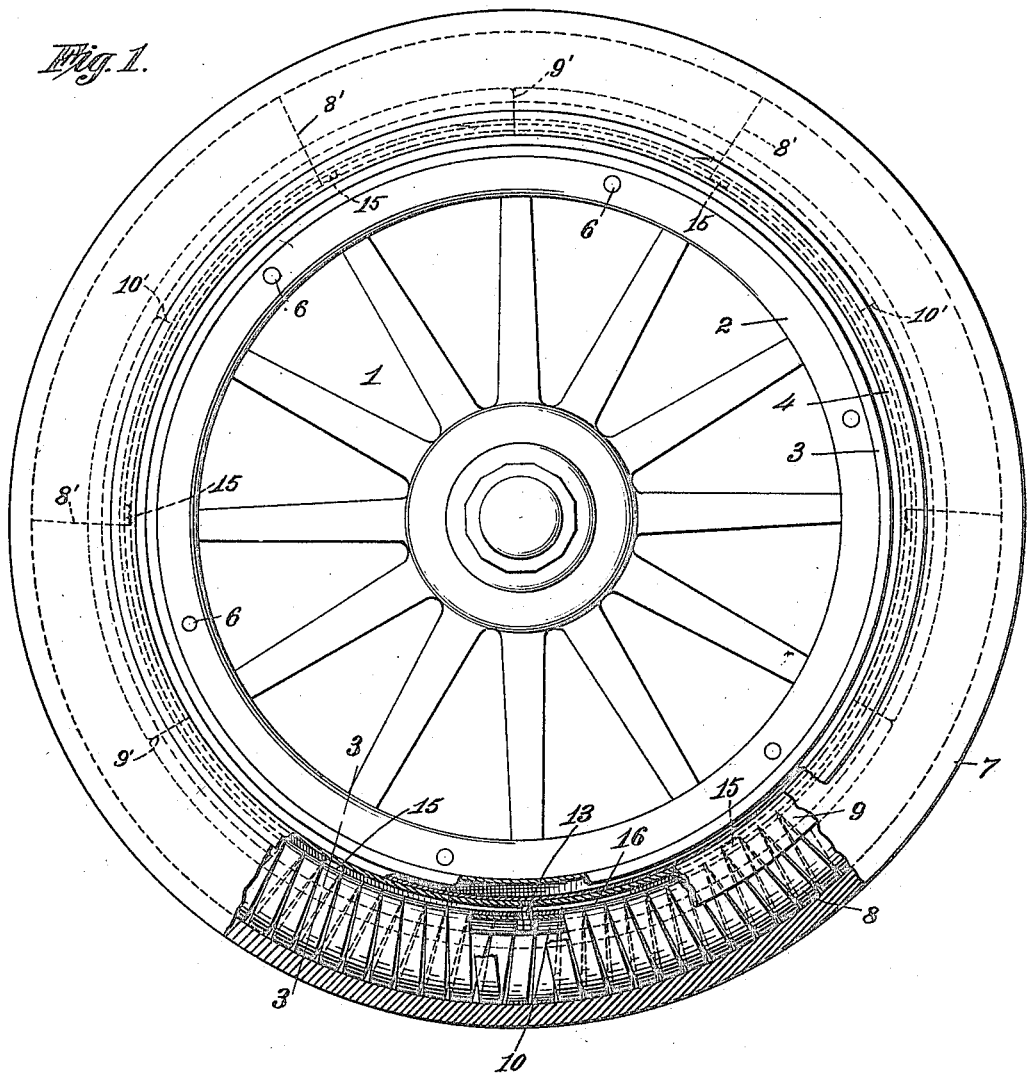
Figure 2:
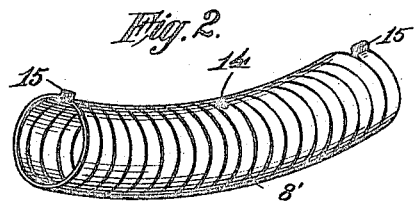
Figure 3:
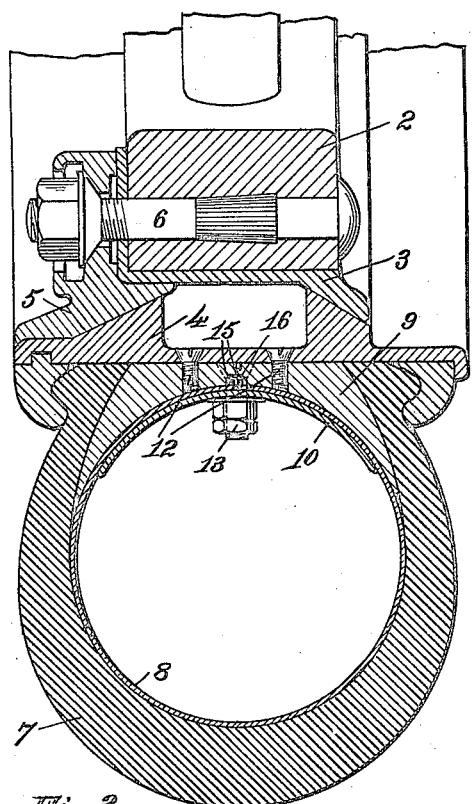
Figure 4:
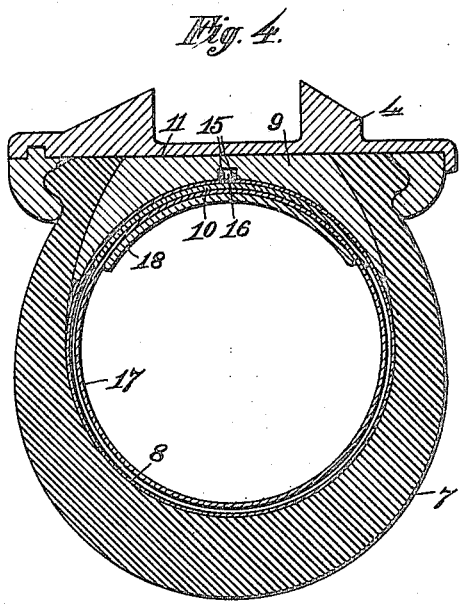
Figure 5:
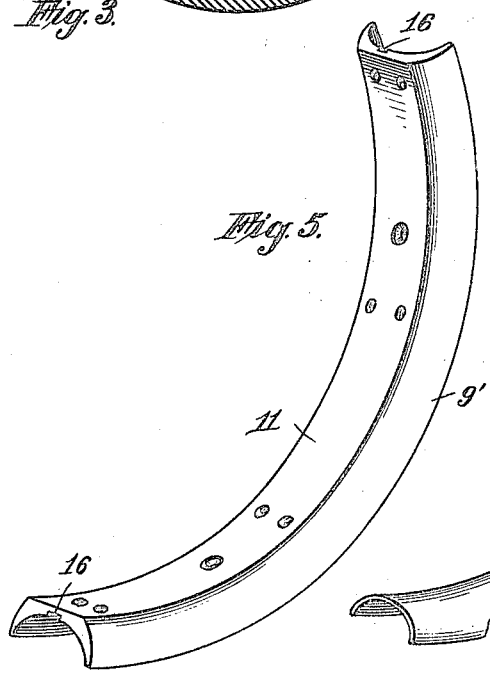
Figure 6:
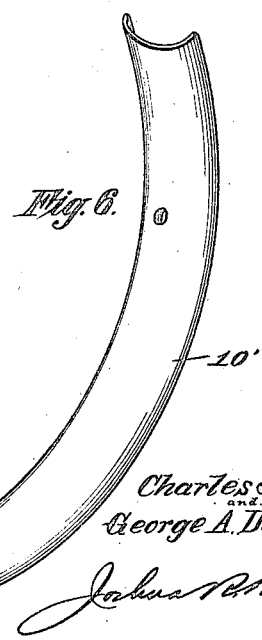

With these objects in view our invention consists generally in a tire shoe and an insert for the same replacing the usual inner tube and comprising a helically coiled spring member and means for securing the same in position. Our invention further consists in a tire as mentioned in which the spring member is formed of a plurality of sections. Our invention further consists in a device as mentioned in which the inner portions of the several convolutions of the spring member are held between inner and outer clamping members which are preferably secured to the rim. Our invention further consists in a device as mentioned characterized by ears formed on the ends of the spring sections and arranged within recesses in one of the clamping members. Our invention further consists in various details of construction and arrangements of parts all as will be fully described hereinafter and particularly pointed out in the claims.
Our invention will be more readily understood by reference to the accompanying drawings forming a part of this specification and in which:

Fig. 1 is a side elevation, partially in section, of a wheel equipped with a tire embodying our invention, Fig. 2 is a perspective view of one of the spring insert sections, Fig. 3 is an enlarged transverse section on the line 3—3 of Fig. 1, Fig. 4 is a view similar to Fig. 3 illustrating a modified form, and Figs. 5 and 6 are perspective views of the inner and outer clamping members respectively.

Referring now to drawings 1 indicates a vehicle wheel of which 2 is the felly and 3 the fixed rim. 4 indicates a demountable rim held in place by a ring 5 and a plurality of bolts 6. The portions of the device so far mentioned may be of any ordinary or preferable form.

Arranged upon the rim 4 is a tire shoe 7 held in place by the usual rings. The tire shoe 7 is preferably of the ordinary form, but it will be obvious, as the description proceeds that other forms of shoes may be employed without departing from our invention. Arranged within the shoe 2, and replacing the usual inner or pneumatic tube, is the resilient insert 8, comprising a helically coiled spring member. This is formed of a strip of flat spring steel coiled to the proper diameter to fit snugly within the shoe, the breadth and gage of said strip varying with the weight of the vehicle upon which the tire is to be used. This insert is preferably formed of a plurality of sections 8', one of which is illustrated in Fig. 2, and arranged end to end to completely fill the shoe 7.

Suitable means are provided for holding the several sections of the insert in position. This comprises inner and outer clamping members 9 and 10, respectively, between which the inner portions of the several convolutions of the members 8' are securely held. The clamping members 9 and 10 are each formed of several sections, 9' and 10' respectively, to facilitate assembling the device, Figs. 5 and 6 illustrating one section of each member. The inner faces 11 of the sections of the inner member 9 are formed to fit snugly on the periphery of the rim 4, and the sections 9' are secured to the rim by a plurality of screws 12. The outer face of the member 9 is concave transversely to conform to the shape of the spring members 8'. The outer member 10 is preferably rolled from a steel plate to conform to the shape of the resilient insert, and bolts 13 are provided to securely clamp the members 9 and 10 together, with the adjacent portions of the insert between, as clearly illustrated in Fig. 3 of the drawings. The bolts

13 are arranged to pass through apertures 14 in one of the convolutions of the insert sections 8', and these apertures are preferably arranged at approximately midway of the length of the spring sections as indicated.

In order to hold the ends of the sections 8' in position, and to prevent undue expansion and contraction of the sections, the ends of the strip of which each section 8' is formed are bent outwardly forming lugs 15 which are arranged in a recess 16 formed in the clamping member 9, said recess preferably comprising an annular groove in the outer face of said member.

In Fig. 4 of the drawings we have illustrated a slightly modified form of the invention which is adapted for use upon heavy vehicles. In this form we arrange within the primary spring insert 8 a similar secondary insert 17 held in place by an additional clamping member 18 similar to the clamping member 10. The auxiliary insert 17 thus constitutes a buffer member giving additional strength to the device for heavy vehicles.

It is obvious that a tire of the construction above described possesses as much resiliency as the ordinary pneumatic tire, and that the same is not subject to the same disadvantages of puncture and blow-out as the latter. Also should an accident occur to either the tire shoe or the insert the device may be readily removed from the wheel and repaired. Furthermore by selecting the proper stock from which to form the spring insert, the device may be designed to fill the needs of any vehicle with which it is designed to be used.

We claim:

1. In a device of the class described, a wheel rim and a tire shoe thereon in combination with an insert formed of a plurality of similar sections, each section comprising a helically coiled member and inner and outer clamping members secured to said rim, and securing a portion of each convolution of the insert members therebetween, the ends of said helically coiled members being bent outwardly forming ears, and one of the clamping members being provided with means to receive said ears.

2. In a device of the class described a rim and a tire shoe thereon in combination with an insert comprising a plurality of similar sections each formed of a strip of resilient material bent into helical form, inner and outer clamping members secured together and securing a portion of each convolution of said insert between them, said inner clamping member being secured to said rim, each of said insert sections being provided with an aperture in one of the convolutions substantially midway of the length thereof, a bolt passing through said clamping members and said aperture, and cooperating means on the ends of said sections and one of said clamping members for holding said ends in position, substantially as described.

3. In a device of the class described, a wheel rim and a tire shoe thereon in combination with an insert formed of a plurality of similar sections, each section comprising a helically coiled member and inner and outer clamping members each being formed of a plurality of similar sections, and means for clamping said members together, substantially as described.

4. In a device of the class described, a tire shoe and an insert for the same comprising strips of resilient material bent into helical form, means for clamping the same in position, a buffer member arranged within said insert and formed of strips of resilient material bent into helical form, means for clamping said buffer member in position, said insert and said buffer member each formed of a plurality of similar non-interlocking sections arranged end to end, substantially as described.

In testimony whereof we have signed our names to this specification in the presence of two subscribing witnesses.

CHARLES JÖRGENSEN.
GEORGE A. DUNMORE.

Witnesses:
YVETTE TRUDEAU,
STUART N. ROBSEN.